March 21, 1939. W. WITHINGTON 2,151,577
WEED CUTTING IMPLEMENT
Filed Oct. 6, 1936
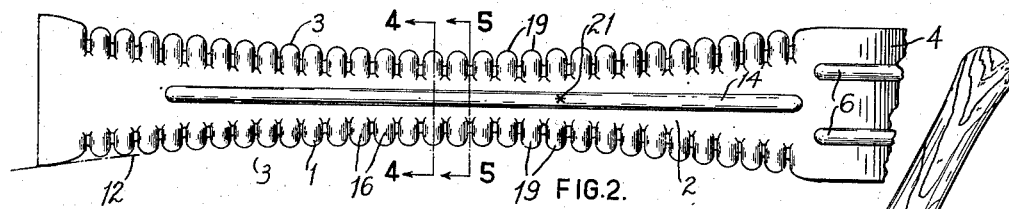
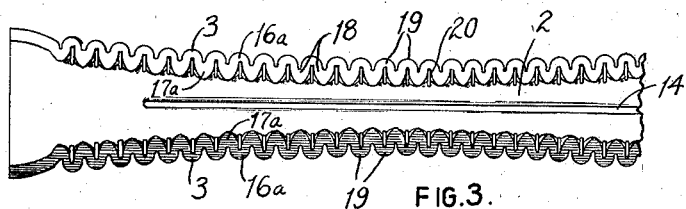
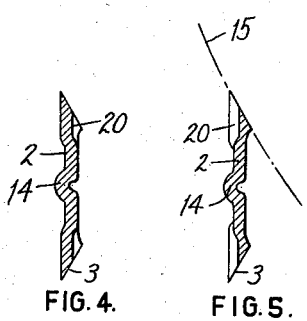
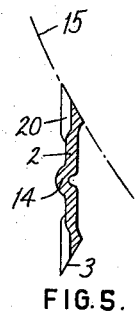
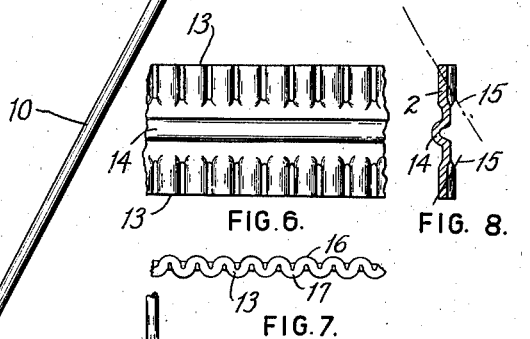
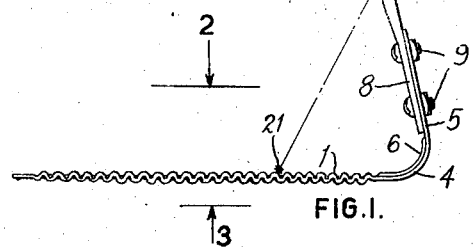
INVENTOR.
WINTHROP WITHINGTON,
ATTORNEY.

Patented Mar. 21, 1939

2,151,577

UNITED STATES PATENT OFFICE 2,151,577

WEED CUTTING IMPLEMENT

Winthrop Withington, Shaker Heights, Ohio, assignor to The American Fork & Hoe Company, Cleveland, Ohio, a corporation of Ohio Application October 6, 1936, Serial No. 104,267

6 Claims. (Cl. 30—318)

This invention relates to weed cutting implements and particularly to implements of this class comprising a cutter head and a handle secured thereto. The invention relates furthermore to methods for making such implements.

It is among the objects of this invention:

To provide an improved implement of this class.

To provide an implement of this class having an improved cutter head construction.

To provide a cutter head for implements of this class having an improved construction of cutting edge.

To provide an improved method for forming the cutting edge of an implement of the class referred to.

To provide an implement of the class referred to having an improved mode of operation.

My invention is fully disclosed in the following description taken in connection with the accompanying drawing in which:

Fig. 1 is a side elevational view to a reduced scale of a weed cutting implement embodying my invention;

Fig. 2 is a fragmentary view taken from the plane 2 of Fig. 1 illustrating a part of a cutter head of Fig. 1;

Fig. 3 is a fragmentary view taken from the under side of the head of Fig. 2, that is to say, from the plane 3 of Fig. 1;

Figs. 4 and 5 are cross sectional views to enlarged scale taken from the planes 4—4 and 5—5 respectively of Fig. 2 and drawn to a larger scale;

Figs. 6, 7 and 8 are respectively plan, side elevation, and end views of a fragment of the cutter head of the other figures illustrating the same during the process of making it and therefore illustrating a step of said process.

Fig. 9 is a fragmentary rear elevational view of the implement of Fig. 1.

Referring to the drawing I have shown at 1 the cutter head of the weed cutting implement of my invention, the head being formed from sheet metal and comprising an elongated body portion 2 having opposite cutting edges 3—3 thereon, the sheet metal body portion 2 terminating at its rearward end beyond the termination of the edges 3—3, in a rearwardly upwardly bent heel portion 4 terminating in an upwardly forwardly extending straight flat shank portion 5. The heel portion 4 is preferably provided with strengthening ribs 6—6 pressed in the metal to prevent undue bending at the heel. A handle illustrated generally at 7 is provided formed from round metal rod having a flattened end 8 superimposed upon the inner side of the straight shank portion 5 and bolted thereto by bolts 9—9 and beyond the shank being bent upwardly rearwardly as at 10. Preferably the handle portion 10 is of considerable length and is provided with a handle 11 on the upper end thereof whereby the user may operate the cutter without stooping. The handle portion 10 is preferably of small enough diameter to be slightly flexible and the entire implement may be operated generally like a golf club, the head 1 swinging through an arc near to the ground and cutting off weeds by the cutting edges 3—3 in a manner to be more fully described hereinafter.

The head proper 2, which is preferably integral with the heel 4 and shank 5, is formed from flat sheet metal preferably by the following method.

The opposite side edges of the body portion 2 are cut concave along curvilinear lines such as that indicated at 12 in Fig. 2 and then the edges are press-formed into corrugations as shown in Figs. 6 and 7, the corrugations extending inwardly from the edge 13 of the flat blank a suitable distance, for example, twice as much as the width of the corrugations themselves. At the same time, a straightening rib 14 is preferably formed along the longitudinal center of the head between the concave rows of corrugations. The corrugations 13—13 extend substantially over the entire length of the head.

The corrugations 13 thus formed are then ground off on the under sides thereof, that is to say on the under side of the head, the grinding being performed to bevel off the under sides of the corrugated edges, in approximately the direction indicated by the lines 15—15, Fig. 8. As will be understood and as illustrated in Figs. 6, 7 and 8, particularly Fig. 7, the corrugations are generally semi-cylindrical as shown at 16 and 17 Fig. 7 so that the grinding operation on the undersides thereof, will leave generally elliptical surfaces, 16—a and 17—a, Fig. 3, which merge into each other and form a continuous zig-zag ground surface 18 as shown in Fig. 3 on the under side of the head 2.

A cutting edge 3 is thus provided consisting of sharp edged teeth 19—19 bevelled on their under sides, the form of the teeth being further illustrated in the cross sectional views, Figs. 4 and 5.

It will be observed that although the teeth are formed from relatively thin sheet metal, each tooth is, inwardly of its forward point, of channel form in cross section as shown in Figs. 4 and 5 and as indicated at 20 in Fig. 3, the channel being that of the remaining part of the corrugation 13 from which the tooth was formed. The teeth therefore, while having sharp cutting edges are of great strength, being of ribbed or channel form at their bases.

The above described grinding operation to form the teeth in the first instance, can be repeated to sharpen the teeth if they should become dulled and this operation may be performed by the user with an ordinary grindstone, a carborundum scythe stone, etc. The length of corrugation illustrated in the drawing, if provided in the head by the above described operations, will provide sufficient metal for many successive grindings, each grinding restoring the sharp edge to the teeth.

The concave configuration of the teeth illustrated and referred to above effects a "gathering" action on the weeds being cut.

The handle portion 10 is, as illustrated, preferably straight and disposed at such an angle to the head proper 2, that its axis intersects the head nearer the rearward end than the forward end, for example as shown at 21, Figs. 1 and 2.

I claim:

1. In a weed or the like cutting implement, an elongated sheet metal blade having cutting edges on opposite sides thereof provided each with cutting teeth, said cutting teeth being formed by providing transversely extending corrugations pressed from the blade metal and bevelling the corrugations from one face of the blade to provide generally V-form serrations, an elongated flexible rod-like handle connected at one end to the rear end of the cutting blade and extending upwardly therefrom at a rearward inclination and having an enlarged hand grip at its upper end, the axis of the handle normally intersecting the blade at a point nearer its rearward end than its forward end, and at least one of the cutting edges being of concave form to effect a gathering of weeds towards the center portion of the blade.

2. In a weed or the like cutting implement, a one-piece elongated sheet metal blade having cutting edges on opposite sides thereof provided each with cutting teeth, said teeth being formed by providing transversely extending corrugations pressed from the blade metal and bevelling the corrugations from one face of the blade to provide generally V-formed serrations, the rearward end of the blade being bent upwardly and then forwardly to provide a blade shank, an elongated flexible rod-like handle connected at one end to the shank of the blade and bent to extend upwardly therefrom in a substantially straight handle shaft at a rearward inclination and having an enlarged hand grip on the upper end of the shaft, the axis of the shaft normally intersecting the blade at a point nearer its rearward than its forward end, at least one of the blade cutting edges converging toward the longitudinal axis of the blade from the blade outer end toward the central portion of the blade to effect a gathering of weeds towards said central portion.

3. A cutter blade comprising an elongated sheet metal body having an edge portion thereof formed into laterally extending corrugations, the corrugations extending over a major portion of the blade length, the corrugations being beveled from one face of the blade to provide generally V-form serrations, and the cutting edge being curved inwardly from the outer ends of the blade towards the central portion.

4. A cutter blade for weeds and the like comprising an elongated sheet metal body having opposite edge portions formed into transversely extending corrugations, the corrugations being beveled from one face of the blade to provide generally V-shaped cutting serrations, and the blade being progressively narrowed transversely from an end thereof toward the central portion of the blade to effect a gathering of weeds and the like towards said central portion.

5. A cutter blade for weeds and the like comprising an elongated sheet metal body having opposite longitudinal extending edge portions formed with transverse corrugations, the corrugations extending above and below the adjacent un-corrugated portions of the body, the corrugated edge portions of the body being beveled from the top face of the blade convergingly toward the bottom face to form cutting edges, and means for securing an end portion of the blade to a handle.

6. A cutter blade for weeds and the like comprising an elongated sheet metal body having opposite longitudinally extending edge portions formed with transverse corrugations provided by pressing portions of the blade metal above and below adjacent un-corrugated portions of the body, the corrugated edge portions of the body being beveled to provide generally V-shaped serrations having the apex of each serration adjacent the bottom cutting face of the blade, and means for securing an end portion of the blade to a handle.

WINTHROP WITHINGTON.